(12) United States Patent
Assadollahi

(10) Patent No.: US 8,880,595 B2
(45) Date of Patent: Nov. 4, 2014

(54) ASYNCHRONOUS, PASSIVE KNOWLEDGE SHARING SYSTEM AND METHOD

(71) Applicant: ExB Asset Management GmbH, Munich (DE)

(72) Inventor: Ramin O. Assadollahi, Munich (DE)

(73) Assignee: ExB Asset Management GmbH, Munich (DE)

( * ) Notice: Subject to any disclaimer, the term of this patent is extended or adjusted under 35 U.S.C. 154(b) by 161 days.

(21) Appl. No.: 13/708,909

(22) Filed: Dec. 7, 2012

(65) Prior Publication Data
US 2013/0304802 A1  Nov. 14, 2013

(30) Foreign Application Priority Data
Dec. 8, 2011  (EP) ..................................... 11192677

(51) Int. Cl.
| | |
|---|---|
| *G06F 15/16* | (2006.01) |
| *G06Q 10/10* | (2012.01) |
| *G06F 17/30* | (2006.01) |
| *H04L 29/08* | (2006.01) |

(52) U.S. Cl.
CPC ................ *H04L 67/10* (2013.01); *G06Q 10/10* (2013.01); *G06F 17/30867* (2013.01)
USPC ........... 709/203; 715/753; 706/50; 297/260.2

(58) Field of Classification Search
USPC ........... 709/203; 715/753; 706/50; 297/260.2
See application file for complete search history.

(56) References Cited

U.S. PATENT DOCUMENTS

| | | | |
|---|---|---|---|
| 2011/0137845 A1* | 6/2011 | Ward ............................. | 706/50 |
| 2011/0248535 A1* | 10/2011 | Lapointe .................... | 297/260.2 |
| 2011/0258535 A1 | 10/2011 | Adler, III et al. | |
| 2011/0258560 A1* | 10/2011 | Mercuri et al. ............... | 715/753 |

OTHER PUBLICATIONS

European Patent Office, Extended European Search Report issued in EP Application 11192677.0, dated May 31, 2012, 6 pages.

* cited by examiner

*Primary Examiner* — Tammy Nguyen
(74) *Attorney, Agent, or Firm* — Hanley, Flight & Zimmerman, LLC.

(57) ABSTRACT

A system for knowledge sharing comprises a remote electronic device comprising distribution means configured to automatically determine that one or more sender constraints are met for a plurality of first data entities; data gathering means configured to allow the reception of the plurality of first data entities from the remote electronic device, subject to one or more recipient constraints; and store the received plurality of first data entities in a database of the electronic device; matching means configured to identify a relevance of one or more of the plurality of first data entities when generating a new data entity on the electronic device; display means configured to display one or more of the identified first data entities when generating the new data entity; and editing means configured to use data from one or more of the displayed first data entities for generating the new data entity.

15 Claims, 3 Drawing Sheets

ASYNCHRONOUS, PASSIVE KNOWLEDGE SHARING SYSTEM AND METHOD

The present document relates to a system and method for knowledge sharing. In particular, the present document relates to a knowledge sharing system and method which reduces the degree of interaction required by the users of the system and method.

The present document introduces a passive knowledge sharing system and method that may comprise a passive incentivisation or bonus mechanism eliminating the drawbacks of conventional document repositories, wilds and social media. The methods and systems described in the present document aim at improving the knowledge workflow on at least two fundamental steps in the workflow process. A typical knowledge worker's workflow can be summarized by the following process steps:

1) Collect data on a particular topic in view of a particular task;
2) "Consume" the collected data by processing (e.g. thinking about) the collected data in the context of the particular task;
3) Produce new data (e.g. conclusions, summaries, reports) in view of the particular task;
4) Share the produced data with others;

Thus, the workflow of a knowledge worker implies activities related to incoming and outgoing data (step 1 and 4). Generally, these two process steps are not attributed to generating a high value in the process (typically, the steps 2 and 3, i.e. thinking about a topics and generating good reports, are usually highly valued). Nevertheless, steps 1 and 4 can be time consuming. It is thus desirable to reduce the complexity and resource consumption related to the collection and the sharing of data to a minimum.

In the present document, the nature of different information streams in the context of the workflow of a knowledge worker are analyzed, the problems of available approaches are highlighted and new systems and methods which address the shortcomings of available knowledge workflow systems are outlined. In particular, knowledge workflow systems and methods are described which support the above mentioned workflow by providing automated means for sharing (i.e. for distributing and collecting) data.

According to an aspect, an electronic device for a knowledge sharing system is described. The electronic device may be a portable electronic device comprising a storage medium for storing a database. As such, each of the portable electronic devices within the knowledge sharing system may comprise their dedicated databases. In an embodiment, the electronic device comprises data gathering means configured to allow the receipt of a plurality of first data entities from a remote electronic device (e.g. allow the remote electronic device to push the plurality of first data entities to the electronic device). The data entities may be e.g. text documents or pictures. The authorization for receiving the plurality of first data entities at the electronic device may be subjected to one or more recipient constraints. As will be outlined in the following, the one or more recipient constraints may be constraints with regards to the remote electronic device and/or with regards to the plurality of first data entities. Typically, the recipient constraints can be controlled/set by the electronic device in its function as a recipient of shared information. The data gathering means are typically configured to store the pushed plurality of first data entities in a database of the electronic device. In a similar manner to the receiving, the storing may be subjected to the one or more recipient constraints. As a result, the electronic device comprises a database which stores the plurality of first data entities.

The electronic device may further comprise means for generating a new data entity. When generating a new data entity, the electronic device may make use of matching means which are configured to identify a relevance of one or more of the plurality of first data entities. The relevance of a first data entity from the plurality of first data entities may be identified by determining that a correlation between content of the new data entity and the first data entity exceeds a pre-determined correlation threshold. By way of example, the already generated content of the new data entity may be analyzed to identify a keyword and/or a keyphrase. Subsequently, the content of the plurality of first data entities and/or first metadata associated with the plurality of first data entities may be analyzed with regards to the identified keyword and/or keyphrase. Depending on the density of the identified keyword and/or keyphrase in a first data entity, the first data entity may be attributed a relevance score indicating the relevance of the first data entity for the generation of the new data entity. If the relevance score exceeds a pre-determined relevance threshold, the first data entity may be considered to be a match.

Furthermore, the electronic device may make use of display means configured to display one or more of the identified first data entities when generating the new data entity. By way of example, a subset of the identified first data entities (e.g. the once having the highest relevance score) may be displayed on the electronic device (i.e. indicia of the identified data entities may be displayed). In addition, the electronic device may comprise editing means configured to use data from one or more of the displayed first data entities for generating the new data entity. By way of example, the editing means may be configured to open one or more of the displayed first data entities and/or paste-and-copy an excerpt of the opened first data entity to the new data entity.

Furthermore, the electronic device may comprise feedback means configured to track a consumption of one or more of the plurality of first data entities; wherein a data entity is consumed if it has been identified, displayed or used. The information regarding the tracked consumption may be used to control the future reception of a data entity from the remote electronic device at the electronic device (e.g. via a recipient constraint which depends on the tracked consumption). Information regarding the tracked consumption may be provided to a destination external to the electronic device (e.g. the remote electronic device) and/or a sharing server. Such information regarding the tracked consumption may e.g. be an indication that data sharing with a particular remote electronic device is un-subscribed/disabled.

In particular, the feedback means may be configured to track the consumption by updating a usage counter for the remote electronic device, wherein the usage counter is incremented if one or more of the plurality of first data entities have been identified, displayed or used. The usage counter may be provided to an external destination (e.g. the remote electronic device and/or the sharing server).

Overall, an electronic device for a knowledge sharing system has been described which collects data entities from one or more remote electronic devices. The data entities are stored in the database of the electronic device and the data entities may be used in the context of the generation of a new data entity on the electronic device. The consumption of the collected data entities is tracked and the tracked consumption is used as feedback (e.g. towards the one or more remote electronic devices). In particular, the tracked consumption may be used to control the data collection process. In an embodiment, the one or more recipient constraints used by the data gathering means comprise a usage constraint requiring that the usage counter for the remote electronic device exceeds a pre-determined usage threshold. This means that only if the consumption of data entities provided by the remote electronic device is sufficiently high, further data entities from the remote electronic device are allowed to be received and stored on the electronic device.

The usage counters may be tracked per data entity. The feedback means may be configured to increment the usage counter by a higher amount if a particular data entity of the plurality of first data entities is used than if the particular data entity is only displayed; and a higher amount if the particular data entity is displayed than if the particular data entity is only identified. Furthermore, the feedback means may be configured to apply a temporal decay to the usage counter. Typically, the usage counters are initiated with a value exceeding the usage threshold. If the data entity is not used for a certain amount of time, the usage counter may drop below the usage threshold (as a result of the temporal decay).

The one or more recipient constraints may comprise a selection constraint to requiring that the plurality of first data entities has been selected for sharing. By way of example, the remote electronic device may have selected or de-selected data entities stored on the remote electronic device. Data entities which are not selected for sharing will be prevented from being received at the electronic device. Alternatively or in addition, the data gathering means of the electronic device may be configured to provide information regarding the selection of the plurality of first data entities stored on the remote electronic device. By way of example, the data gathering means may have access to a sharing server which comprises first metadata regarding the plurality of first data entities. The data gathering means may analyze the first metadata and select or de-select some or all of the plurality of first data entities for reception.

The one or more recipient constraints may comprise an enabling constraint requiring that the plurality of first data entities meets one or more of the following conditions: the plurality of first data entities comprises one or more keywords and/or keyphrases, the plurality of first data entities meets one or more semantic rules. The data gathering means may be configured to provide information regarding the one or more conditions. By way of example, the data gathering means may provide selection data (e.g. to the sharing server). The selection data may comprise one or more keywords and/or keyphrases with regards to data entities that the electronic device allows to receive. The sharing server may match the selection data provided by the electronic device with first metadata provided by the remote electronic device and thereby identify the plurality of first data entities which meets the enabling constraint.

The one or more recipient constraints may comprise an inhibiting constraint requiring that the plurality of first data entities and/or the remote electronic device are not part of a black list. By way of example, the electronic device may verify that a data entity received at the electronic device originated from a remote electronic device which is not part of the black list.

As such, various recipient constraints may be defined which are used to control the data gathered by the electronic device. It should be noted that a first of the one or more recipient constraints may override a second of the one or more recipient constraints, e.g. an inhibiting constraint may override an enabling constraint. Overall, the one or more recipient constraints may be used to implement an automated data gathering process which is set up only once (when defining one or more recipient constraints, e.g. an enabling constraint).

Subsequently, data entities may be automatically received and stored at the electronic device without user interaction. Furthermore, the data gathering process automatically adapts to the requirements of the user of the electronic device due to the defined feedback mechanism.

The electronic device may further comprise deleting means configured to delete one or more of the plurality of first data entities from the database, subject to a deletion constraint. The deletion constraint may comprise any one or more of: an observation that the one or more of the plurality of first data entities has not been identified, displayed and/or used for a pre-determined time period; and/or an observation that a storage threshold has been reached; and/or an observation that the one or more of the plurality of first data entities comprise one or more keywords and/or keyphrases.

The electronic device may further be configured to share data entities with other electronic devices, e.g. the remote electronic device. For this purpose, the electronic device may comprise distribution means configured to specify a plurality of remote electronic devices comprising a plurality of remote databases for sharing a plurality of second data entities stored on the database of the electronic device. By way of example, the distribution means may edit a recipient list on a sharing server, wherein the recipient list comprises the plurality of remote electronic devices which may download and/or which should receive the plurality of second data entities. The distribution means may be configured to push the plurality of second data entities to the plurality of remote electronic devices. For this purpose, the distribution means may take into account one or more constraints defined by the respective remote devices for receiving data entities from the electronic device. Furthermore, the distribution means may be configured to push one or more of the plurality of second data entities to the plurality of remote electronic devices, subject to updating the one or more of the plurality of second data entities at the electronic device. As such, the distribution means may ensure that a data entity which originates from the electronic device is kept up-to-date at a remote electronic device.

Furthermore, the distribution means may be configured to enable the sharing of one or more of the plurality of second data entities with one or more of the plurality of remote electronic devices only subject to one or more sender constraints. In a similar manner to the recipient constraints, the one or more sender constraints may be constraints with regards to the remote electronic device(s) and/or with regards to the plurality of second data entities. Typically, the sender constraints can be controlled/set by the electronic device in its function as a sender of shared information.

As such, the one or more sender constraints may comprise a usage constraint requiring that the usage counter for data entities provided to the remote electronic device exceeds a pre-determined usage threshold. The usage counter may be determined as outlined above and may be provided to the electronic device from the remote electronic device. Alternative or in addition, the sender constraints may comprise a selection constraint requiring that the plurality of second data entities has been selected for sharing. Alternative or in addition, the sender constraints may comprise an enabling constraint requiring that the plurality of second data entities meets one or more of the following conditions: the plurality of second data entities comprises one or more keywords and/or keyphrases, the plurality of second data entities meets one or more semantic rules. Alternative or in addition, the sender constraints may comprise an inhibiting constraint requiring that the plurality of second data entities and/or the remote electronic device are not part of a black list or do not meet a pre-defined inhibiting condition (e.g. a condition requiring that a shared Email should not originate from a particular pre-defined originator).

Overall, the distribution means may be configured to push one or more of the plurality of second data entities to a particular remote database of a particular remote electronic device, subject to one or more sender constraints. As indicated above, the one or more sender constraints may comprise a usage constraint requiring that a consumption by the particular remote electronic device of data entities originating from the electronic device exceeds a pre-determined consumption threshold. Alternatively or in addition, the one or more sender constraints may comprise a selection constraint requiring that the plurality of second data entities has been selected for sharing. Alternatively or in addition, the one or more sender constraints may comprise an enabling constraint requiring that the plurality of second data entities meets one or more of the following conditions: the plurality of second data entities comprises one or more keywords and/or keyphrases, the plurality of second data entities meets one or more semantic rules. Alternatively or in addition, the one or more sender constraints may comprise an inhibiting constraint requiring that the plurality of second data entities and/or the particular remote electronic device are not part of a sender black list.

According to a further aspect, a knowledge sharing system is described. The knowledge sharing system comprises a plurality of electronic devices which are configured according to any of the aspects and features outlined in the present document. In particular, the knowledge sharing system may comprise a first electronic device (also referred to as the remote electronic device) and a second electronic device (also briefly referred to as the electronic device).

The remote electronic device (i.e. the first electronic device) may comprise distribution means configured to automatically determine that one or more sender constraints are met for a plurality of first data entities; wherein the one or more sender constraints comprise an enabling constraint requiring that the plurality of first data entities meets one or more of the following conditions: the plurality of first data entities comprises one or more keywords and/or keyphrases, the plurality of first data entities meets one or more semantic rules. Furthermore, the remote electronic device (i.e. the first electronic device) may be configured to push the plurality of first data entities to an electronic device (106). The pushing of the plurality of first data entities may be initiated by sharing means comprised within the knowledge sharing system, as will be outlined below.

The electronic device (i.e. the second electronic device) may comprise data gathering means configured to allow the reception of the plurality of first data entities from the remote electronic device, subject to one or more recipient constraints. The received plurality of first data entities may be stored in a database of the electronic device (i.e. of the second electronic device). In addition, the electronic device may comprise matching means configured to identify a relevance of one or more of the plurality of first data entities when generating a new data entity on the electronic device; wherein identifying the relevance of a first data entity from the plurality of first data entities comprises determining that a correlation between content of the new data entity and the first data entity exceeds a pre-determined correlation threshold. Furthermore, the electronic device (i.e. the second electronic device) may comprise display means configured to display one or more of the identified first data entities when generating the new data entity, and editing means configured to use data from one or more of the displayed first data entities for generating the new data entity.

The first electronic device (i.e. the remote electronic device) may comprise a first database comprising a plurality of first data entities and first metadata indicative of keywords and/or keyphrases and/or semantic rules of each of the plurality of first data entities. In addition to the electronic devices, the knowledge sharing system may comprise a sharing server configured to store an image (e.g. a copy) of the first metadata. The sharing server may comprise sharing means which are configured to enable the second electronic device to select the first electronic device for sharing of a data entity. By way of example, the second electronic device may edit a source list at the sharing server, wherein the source list comprises the one or more electronic devices from which the second electronic device allows to receive data entities.

Furthermore, the sharing means may be configured to enable the second electronic device to set one or more conditions (e.g. the sender constraints used by the first, i.e. remote, electronic device and/or the recipient constraints used by the second electronic device) for sharing a data entity. In particular, the one or more conditions may be the enabling constraint of the remote electronic device, i.e.: the shared data entity comprises one or more keywords and/or keyphrases, the shared data entity meets one or more semantic rules. By way of example, the sharing server may comprise selection data which may be edited by the second electronic device to specify the above mentioned one or more conditions.

The sharing means may be configured to initiate the storing of one or more of the plurality of first data entities onto the second database if the first electronic device is selected and if one or more of the set conditions are met for the one or more of the plurality of first data entities. By way of example, the sharing server may map the first metadata with the one or more conditions and thereby determine the data entities which are to be stored on the second electronic device. The sharing server may initiate the first electronic device to send the one or more of the plurality of first data entities to the second electronic device. Furthermore, the sharing server may initiate the second electronic device to store the received data entities in the second database.

The first metadata may comprise a white list of electronic devices which are allowed to receive the plurality of first data entities and/or a black list of remote electronic devices which are not allowed to receive the plurality of first data entities. In this case, the sharing means may be configured to enable and/or prevent the storing of the plurality of data entities, subject to the white list and/or black list.

The first (i.e. remote) electronic device may be configured to provide updated first metadata to the sharing server, subject to updating at least one of the plurality of first data entities. In this case, the sharing server may be configured to inform the second electronic device about the updated first metadata regarding the one or more of the plurality of first data entities stored on the second database. Furthermore, the sharing means may be configured to trigger the storing of the one or more of the plurality of updated first data entities on the second database. Alternatively or in addition, the second electronic device may poll the sharing server for updated first data entities on a regular basis. If available, the second electronic device may be configured to download the one or more of the plurality of updated first data entities to its second database.

According to a further aspect, a method for knowledge sharing is described. The method may comprise, at an electronic device, allowing a remote electronic device to push a plurality of first data entities to the electronic device, subject to one or more constraints; storing the pushed plurality of first data entities in a database of the electronic device; identifying a relevance of one or more of the plurality of first data entities when generating a new data entity on the electronic device; wherein identifying the relevance of a first data entity from the plurality of first data entities comprises determining that a correlation between content of the new data entity and the first data entity exceeds a pre-determined correlation threshold; displaying one or more of the identified first data entities when generating the new data entity; using data from one or more of the displayed first data entities for generating the new data entity; tracking a consumption of one or more of the plurality of first data entities; wherein a data entity is consumed if it has been identified, displayed or used; and/or providing information regarding the tracked consumption.

According to a further aspect, a software program is described. The software program may be stored on a computer-readable medium (which may be tangible or otherwise non-transitory) as instructions that are adapted for execution on a processor and for performing the aspects and features outlined in the present document when carried out on a computing device.

According to another aspect, a storage medium comprising a software program is described. The storage medium may be memory (e.g. RAM, ROM, etc.), optical media, magnetic media and the like. The software program may be adapted for execution on a processor and for performing the aspects and features outlined in the present document when carried out on a computing device.

According to a further aspect, a computer program product is described. The computer program product may comprise executable instructions for performing the aspects and features outlined in the present document when executed on a computing device.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

The invention is explained below in an exemplary manner with reference to the accompanying drawings, wherein FIG. 1 illustrates a block diagram of an example electronic device;

Figure 1:
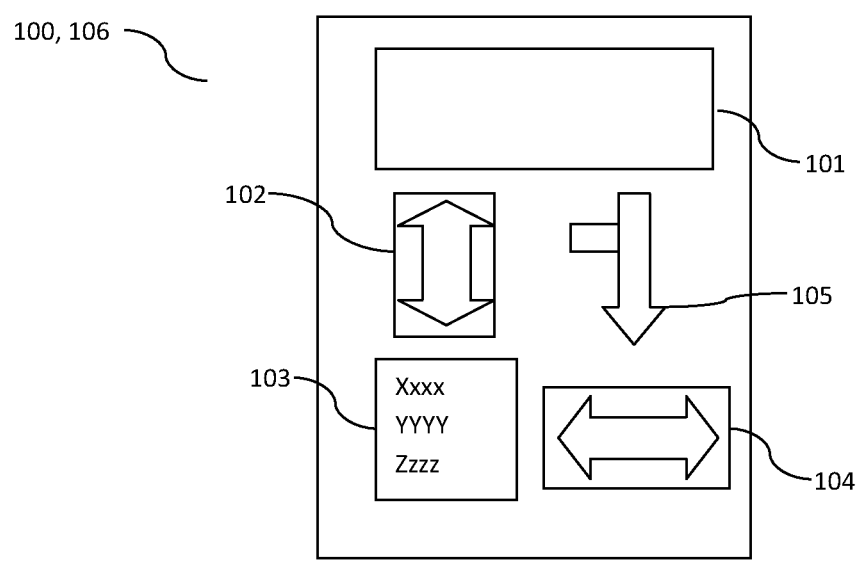

Social networks comprise interlinked users that can share data. This data usually comprises a brief update information or post like "visiting my parents today", or a link to a website, a picture or other interesting information. The present document addresses the concept of sharing some interesting information by a sender with selected recipients.

Services such as Facebook, Twitter or Google+ allow their users to share information among each other. A single user can "post" an interesting article to the public or to a defined group. Typically, the "posting" of information is done by inserting the posted information into the recipient's timeline. For each user, the timeline is composed individually by all posts that were shared with the user. This leads to a serial order of incoming information and the incoming information is (by nature) ordered chronologically along the points in time that the information was shared. One of the drawbacks of such chronological posts is that the timeline comprising the posted information moves ahead even when the recipient is not watching the timeline. This means that potentially relevant information is lost if the user does not supervise the timeline (e.g. during a vacation of two weeks) and somebody posts information during that time. The consumption of this chronologically ordered information usually only happens to a limited extent as scrolling through the timeline and reviewing the posted information is time consuming and users typically do not invest a lot of time in browsing through long timelines of data.

A further problem with chronologically displayed posts is that the amount of data on the timeline depends on the number of senders the recipient is in contact with. Consequently, if a user has many "friends" (as the senders/sharers/posters are called in some social networks) that share information, the timeline is filled rather rapidly. A rapidly filled timeline can reduce the probability that relevant information is actually perceived. As such, the probability for retrieving relevant information from a timeline of posts typically depends on the number of users that share information. As the number of users increases, the probability for retrieving relevant information decreases.

Another example for unsolicited information sharing is a stream of Email messages. Email clients that present incoming directed information chronologically have similar problems to the above mentioned posting system, when it comes to the timing of the relevance. Incoming information may be relevant for points in time that are not identical with the point in time where the information was received (which is the standard view on conventional email clients).

In sum, the linear, chronological presentation of potentially useful information is in many usage scenarios not optimal. Even though the problems related to the chronological representation of incoming information have been described in the context of social networks and Email systems, the present document does not only relate to the area of social networks. The present document also addresses common issues of knowledge and/or document management in organizations. Often, these knowledge and/or document management systems comprise an internet-based service like a wiki and/or a common file repository like Microsoft's SharePoint.

Wikis are hypertext document collections in the internet (or the local intranet) that allow for collaboratively producing and reviewing information that is located on a commonly defined location. In the conventional wikis (such as wikipedia.org), this common location is a key word that extends the URL (uniform resource locator): by way of example, for wikipedia.org, the article on "patents" can be found at Wikipedia.org/wiki/Patent. For accessing such information, the user has to actively navigate to the URL to read the article. Furthermore, the information stored in wikis is not directed, i.e. it is not written for someone specific. Consequently, the authors do not know the people in the audience and it is typically not the intention of an author to inform the potential audience personally.

Common file repositories usually are directories on a shared file system accessible to different users. Often, these shared file systems provide an indexing service on top so that the files which are stored on the server are analyzed automatically and a search index is generated.

Both, shared file systems and internet based wild's are "pull" systems, i.e. the user has to navigate to a specific location in the file system or network and search the system to find the desired information. In contrast, the above mentioned social networks are "push" systems, i.e. the information stack is built up automatically independent of the user's actions.

In organizations, where knowledge is generated and consumed, both of the above mentioned architectures have their positive and negative aspects: in pull systems, users have to actively go to a location and look for the desired information. This means that a user usually has to stop the current production process, thereby loosing valuable time for the production steps 2 and 3 of the knowledge worker's workflow described in the introductory section of the present document. Furthermore the success of finding the required information depends on the user's knowledge where to find the required information or the ability to choose the right keywords in a search engines. On the other hand, in push systems, users typically receive information that may be relevant without doing anything. However, at the same time, the users run into the risk of missing out information or of being overwhelmed with information. A further drawback in push systems is that the pushed information may not be relevant to the task the user is involved in. Thus, the "signal-to-noise" ratio (i.e. the ratio between useful information and useless information) of such push systems may be worse than the "signal-to-noise" ratio in pull systems.

Beyond the drawbacks for the recipients of information in push and pull systems, there are also drawbacks for the senders. As described in the introductory section, sending and sharing (step 4 in the knowledge worker's workflow) is a task where productive people have to change their activity (i.e. producing content) in order to make the information available to others (send/post the content). In some cases, the sender has to generate a list of recipients along with the pieces of information that he wants to share (emails) or he can select from a limited number of possibilities to define an audience for the shared information (e.g. Facebook lists, Google+ circles, Twitter followers). The definition of such lists of recipients is potentially distracting and in many cases time consuming. Furthermore, the generation of lists of recipients may not be an ideal way of finding the right audience for the shared material. In particular, it may not be ensured that a complete list of relevant recipients is generated.

In view of the above described systems and methods, there is a need for a knowledge sharing system which combines the benefits of push based and pull based knowledge sharing systems.

In particular, the described knowledge sharing system aims at improving the sender's and recipient's productivity by providing information shared by collaborators "just in time". The underlying design pattern of the described knowledge sharing system is to keep the information flow between two users (i.e. the sender and the recipient) as "un-aware" as possible to the sender, as well as to the recipient. The recipients should not be distracted by the incoming information and possibly not even generate feedback actively. The senders ideally do not have to actively send/post/copy information, as this would disrupt the perceptive nature of the task they are in (for example reading an article) or add additional workload after production (for example, after writing a report). Thus, the overall system should be a "passive" knowledge sharing system, in order to not distract the sender's and recipient's main activities (sending and receiving are understood as distractive activities in this context).

Embodiments of the described knowledge sharing system may comprise one or more of the following building blocks. These building blocks are to be understood as examples. In particular, knowledge sharing systems may comprise only a subset of the building blocks described below:

1. A plurality of databases: Each user typically has some sort of a database, where the data is kept/stored in. This could be e.g. a file system.
2. A "share" functionality: The "share" functionality allows the sender to push data into a recipient's database. The recipient does not necessarily need to be notified about this insertion of data at the time of the arrival of the data. As a consequence, the chronological structure of social networks/email clients is eliminated and frees the user from having to review the to incoming data or to dedicate awareness to the incoming data.
3. A matching functionality: The knowledge sharing system may be provided with a functionality that constantly matches the content of the data entities stored at the recipient's database with information regarding the recipient's current activity. For example, if the recipient is working on a document, the content of the document is analyzed and matched against data in the database.
4. A data display functionality: Typically, only matching data is presented to the user for review. This is the "just in time" functionality that provides relevant data to the user, when the data is needed (in contrast to push systems where the incoming is provided to a recipient, when the sender sends the data). At the same time, the displayed data (e.g. a presented document) is typically more relevant than a dedicated active search request in pull systems (as the document in production can be analyzed, in order to determine the best matches; which is in contrast to specific keywords provided by a user when performing an active search in pull systems).
5. A usage functionality: The recipient may use the presented information by copying some data out of a presented document or by otherwise using the presented document (for example as an attachment in an email). In a preferred embodiment, the knowledge sharing system comprises a detection mechanism that detects and registers whether text has been copied from a presented document or whether a presented file was used for an active task of the recipient (e.g. for sharing the presented file with another user). As such, the knowledge sharing system may track the degree of usage of data exchanged between the various users of the knowledge sharing system.
6. A feedback functionality: A sender of information may be provided with feedback regarding the usefulness of the sent information. There may be up to three steps to provide the sender with feedback about the sent information. A feedback system may keep record on credit points cumulated for sent information. A high number of credit points of a sender may be linked to benefits for the respective sender. By way of example, the feedback system determines credit points in the following manner: One credit point may be received, when a shared document is identified within a matching set (i.e. as a result of the matching functionality of item 3). Another point may be received, if the recipient actively reviews the shared document (i.e. as a result of the data provisioning functionality of item 4), and a further point might be received, if the recipient actually uses the shared document (i.e. as a result of the usage functionality of item 5). Depending on the design of the knowledge sharing system, a shared document which has turned up in a matching set (item 3), which has been viewed (item 4) or which has been used (item 5) may be defined as a "consumed" document (see further details below). The feedback functionality can be used to give feedback to producers/senders on how valuable their "products" are.

The above mentioned components and functionalities may form the core functionality of an information sharing system. The information sharing system can be further refined with regards to establishing a connection between the sender and the recipient. The following refinements may add to the "passivity" of the information sharing system:

1. By way of example, the sender may share one or more explicitly defined document(s). This may be done by actively selecting the to-be-shared documents, for example in a file browser.
2. Alternatively or in addition, the sender may define "enabling concepts" (such as keywords, phrases or extracted semantic concepts, etc.) that may occur in documents generated or provided at a sender's database. If one or more "enabling concepts" appear in a document generated in the sender's database, the system may automatically share the identified document with the recipient.
3. The sender may define "inhibiting concepts" that prevent documents from being shared.
4. A hierarchy may be defined between the rules provided in the above mentioned items 1, 2 and 3. By way of example, the rule of item 3 (share prevention) overrules the rule of item 2 (automatic sharing). The rule of item 1 may override the rules of items 2 and 3, i.e. the user can explicitly share a document even if there is an "inhibiting concept" trying to prevent the sharing of the document.
5. The sender may define a list of recipients, possibly the recipients may be grouped into a plurality of groups. The sender could (once) send a request to the recipient(s) of a list and ask the recipient(s) for permission to write data into their respective database(s) (request for authorization).
6. For convenience (when working in groups), a recipient may (automatically) share his respective knowledge on a particular topic with the sender of data regarding the particular topic. In other words, a two-way synchronization may be established between two users (the two users forming a team which collectively collects data on a topic).
7. The feedback functionality may be used to manage the authorization for data sharing. Based on the collected credits, the knowledge sharing system may de-authorize a sender (and/or a topic/"enabling concept") from writing data to a user's database. By way of example, if the consumption by the recipient of data provided by a particular sender is low (i.e. if not enough credits were collected by the sender), the sender (or a particular "enabling concept" of the sender) may be de-authorized from writing data to the recipient's database.
8. Received documents that were not consumed by the receiver for a pre-determined period of time, may be deleted automatically in order to manage the amount of data stored within the recipient's database. Alternatively or in addition, a recipient's database may be configured such that documents relating to one or more least used topics/"enabling concepts" are deleted when a pre-determined storage threshold is reached.
9. The knowledge sharing system may detect when a sender changes a document (e.g. adds a paragraph) and may decide to either update the document on the receiver side (if it was not yet consumed) and/or notify the receiver (if it was consumed already, as the recipient may then have to revise some of the data produced by him, based on the updated information).

Note that the above mentioned "refinement" item 2 allows for sharing documents on a particular topic automatically. For example, if a sender writes a document that comprises some of the pre-defined "enabling concepts" then this document is automatically made available to the recipient. Consequently, the amount of activity needed for sharing information is reduced on the sender's side. It should also be noted that a generated document may match against multiple "enabling concepts" and may be shared more than once. As a result of this, a document which is part of multiple "enabling concepts" may be kept within the recipient's database, even if a particular topic (defined by a particular "enabling concept") was not of interest to the recipient (see "refinement" item 8).

A further implication of the knowledge sharing system described in the present document is that the sharing of data may be constrained and controlled. In particular, a document may not be shared with all staff in a company (as is the case in typical file sharing systems), but only with those that were chosen by the sender. This group of possible recipients may be further constrained to those who authorized the sender to write data to their databases. As a result, the quality of the data which is matched and displayed when the recipient works on a new document is increased, as the number of "false positives" is reduced a priori.

Using the "refinement" item 7 and possibly item 8, the knowledge sharing system is enabled to automatically balance the production and the consumption of data without users needing to interact with the system after an initial request and authorization of information sharing. This makes the information exchange between producers and consumers more effective. It may also improve the matching mechanism as the relevance in the recipient's database is continually fine-tuned.

Using the "refinement" item 6 in combination with the "refinement" item 9, the knowledge sharing system may be enabled to allow the sender to be informed when a document was changed by the recipient. This means that updates to a document which was initially shared by the sender may be fed back to the sender. An alert indicating the change in the document may be provided to the sender and other parties.

The knowledge sharing system described in the present document may be used to eliminate much of the coordination communication necessary when people produce content which typically propagates through an organization until the produced content has reached all relevant people.

The knowledge sharing system may be implemented as a peer-to-peer system, i.e. without a central server, e.g. without a central unit doing the calculations regarding the state of the shared information, i.e. regarding the difference between the to-be-shared information and the already shared information. As such, each device within a peer-to-peer knowledge sharing system may compute the relevant shares on its own, i.e. each device determines if (and to what extent) the to-be-shared information has already been shared. The different functionalities and components of a peer-to-peer knowledge sharing system have been described above. Typically, in a peer-to-peer system sender and recipient need to be online/connected when transferring the data. In contrast, when using a central server, the to-be-shared data may be stored on the central server and may be transferred to the recipient even when the sender is not online/connected.

Alternatively, the system may be implemented using a synchronization server that handles the transactions between a plurality of clients. A server can keep/store the data when the sender has sent the data while the recipient is not online As such, the server may work as an intermediate repository for data that is being shared between a plurality of clients. This feature may be of particular benefit for mobile devices which are regularly offline/disconnected. This alternative architecture typically implements a transaction based model where the transactions are processed on a server connecting to multiple clients. As an example, the reciprocal sharing of knowledge between two users is described. In the following, the database is defined as being a combination of files and an associated representational structure. The representational structure may comprise information which is used for the matching process described above. Furthermore, the representational structure may comprise indications and/or descriptions on the data that was shared (e.g. the semantic concepts, enabling concepts and topics mentioned above). The transactions on the server may comprise the addition, deletion or change of documents and the possible implications on the representational structure (for example changing weights or word indices).

Typically, the server does not store copies of the databases of the different users, but stores the transactions that were generated by the clients, i.e. the server acts like a storage medium for "recorded" processes on the clients, as well as a file storage. The server thus sends and receives transactions for changing structures as well as files.

In the following example, it is assumed that both users A and B have authorized each other to send and receive knowledge on a certain topic. This means that for example, A has defined the keyword "cooking recipes" as an "enabling concept", i.e. all documents describing cooking recipes will be shared with B if B authorizes A to write on the database of B on this topic. B has received the authorization to request, granted authorization and has chosen to share back (i.e. also B's new recipes will be written to A's database), asked A to be authorized and A granted access. From now on, the sharing system will copy a new recipe from either party to the other party's database automatically (i.e. "enabling concepts", recipients and authorizations do not have to be negotiated again).

In the first step, client A of user A builds up an initial database. At this state, user B has not entered the sharing process by providing data. The sharing of data using a central server may comprise the following steps:

Step 0) Client A checks whether there is a representational structure (e.g. metadata describing data to-be-shared) for sharing data with client B on the server.

Step 1) If no such representational structure is available, client A imports the files stored in its initial database and builds up a representational structure on its database. A transaction log is recorded regarding the build up of the representational structure.

Step 2) The client A synchronizes with the server (i.e. client A sends the transaction log to the server). In addition, the client may directly provide the representational structure to the server (which could otherwise be built at the server from the transaction log).

Step 3) Optionally, the client A uploads the files imported on the device to the server.

At this stage, the server has a transaction log about how the representational structure was built up on client A and about what files are stored at device A (i.e. within the database of client A). The server does not necessarily store a copy of the files which are stored at device A.

A second user B using client B also initializes his knowledge sharing system, but to in this case, the server has already transaction logs from client A. A knowledge sharing method may comprise the following steps:

Step 0) Client B checks with the server whether there is already data (e.g. files) available to be shared.

Step 1) If there is data available, client B receives the corresponding files (for example Microsoft Word files).

Step 2) Client B receives the transactions from the server and builds up the representational structure.

Step 3) Client B now has the same state as client A.

Step 4) Client B imports data from its own device and extends the representational structure to reflect the imported data.

Step 5) The transaction log regarding the imported data are sent to the server (including the information how conflicts were resolved).

Step 6) Optionally, the imported data files are sent to the server.

Step 7) Client A regularly checks at the server for changes with regards to shared data. Alternatively or in addition, the information regarding changes with regards to shared data may be pushed to client A, instead of the client pulling it.

Step 8) If changes are present, client A receives a list of transactions made on client B.

Step 9) Client A uses these transactions to change its own database.

Step 10) Client A possibly downloads the files.

As a result, the two clients A and B have the same data (i.e. structures and files).

The knowledge bases for the two users are in sync on the particular topic.

Step 5 in the above mentioned knowledge sharing method addresses the issue that when both parties A and B have changed a document and no synchronization has taken place in the meantime, there may be a conflict. In that case one of the users may decide on what to do (keep one of the copies, erase the other copy or merge the changes into one unique copy, etc.).

As a result of the above mentioned method, any change on any of the clients can generate a transaction (e.g. user A has added a document). The transaction is sent to the server, and a second client can replicate the state of the user A using the transaction. This transactional process has the advantage of minimizing the traffic between the two devices, which is especially important for mobile devices, where connectivity (connection quality and bandwidth) and power consumption play an important role.

The transactions may also record the sequence by which changes were done on the representational structure. The sequence of changes may be important for the ultimate result and consequently for the performance of the matching process on both clients. For example, there might be indexing algorithms that lead to different results when document A was imported prior to document B vs. the other way around. This means that the sequence of changes to a database or to the documents within the database may be tracked within the transactions.

FIG. 1 shows an example electronic device 100 (also referred to as 106) which may be used in the knowledge sharing systems described in the present document. The electronic device 100 may be a portable and/or wireless electronic device, e.g. a smartphone, a tablet PC or a laptop PC. The electronic device 100 comprises a database 103 for storing and managing a plurality of data entities. Typical examples of data entities are email messages, text documents, photographic pictures, address book entries, etc. The database 103 may store the plurality of data entities using an organizational structure (e.g. a folder structure). Furthermore, the database 103 may comprise a representational structure or metadata regarding the plurality of data entities. This metadata may comprise information regarding each of the plurality of data entities, as well as information regarding a relationship (e.g. an association) between the plurality of data entities. Information regarding a data entity may comprise keywords, keyphrases and/or topics describing or representing the content of the data entity. Information regarding a relationship between two data entities may comprise an indication of similarity regarding the content of the two data entities.

The electronic device further comprises a data input/output unit 104. On a physical layer, the data input/output unit 104 may comprise a wireless or wireline communication interface in order to exchange data entities with another electronic device or a network (sharing) server. On a logical layer, the data input/output unit 104 may be configured to manage the receipt and storage of data entities on the electronic device 100, as well as the sending of data entities from the electronic device 100. As such, the data input/output unit 104 may manage the above mentioned push and pull mechanisms for receiving and/or sending data entities.

Furthermore, the electronic device 100 comprises a data generation environment 101 which a user of the electronic device 100 can use to generate a new data entity, e.g. a new email message or a new text document. The data generation environment 101 typically comprises a display for displaying the new data entity and editing means, e.g. a keyboard, for composing the new data entity. In addition, the electronic device 100 comprises a data retrieval unit 102 which identifies data entities from the database 103 which have a high degree of relevance for the new data entity which is being generated in the data generation environment 101. In order to determine the relevance of a data entity stored in the database 103 for the generation of the new data entity, the data retrieval unit 102 may determine a correlation between the already composed content of the new data entity and the metadata stored in the database 103. By way of example, if the new data entity comprises text, the data retrieval unit 102 may determine a correlation (e.g. a match) between the already composed text and keywords and/or keyphrases comprised in the metadata. The degree of correlation of a data entity may be indicated by a relevance score.

The retrieved data entities from the database 103 may form a list of retrieved data entities of which the sublist of data entities having the highest relevance score may be displayed in the data generation environment 101. By way of example, indicia for (e.g. titles of) the data entities may be displayed. A user of the electronic device may therefore "just-in-time" identify relevant data entities stored in the database of the electronic device. In particular, the user may choose to view the displayed data entities and eventually use data from some of the displayed data entities. By way of example, the user may "copy and paste" an excerpt of a displayed data entity (e.g. a picture or text) into the new data entity (e.g. a text document).

In addition, the electronic device 100 comprises a feedback unit 105. The feedback unit 105 supervises the data generation environment 101 and the related activities of the data retrieval unit 102. In particular, the feedback unit 105 may track the degree of consumption of each of the plurality of data entities stored in the database 103. By way of example, each of the plurality of data entities may be associated with a usage counter and the feedback unit 105 may increment the usage counter of a data entity if the data entity as been identified (relevance score higher than a first threshold), displayed (relevance score higher than a second threshold which is higher than the first threshold) and/or used (e.g. explicitly opened). The usage counters for the plurality of data entities may be stored along with the metadata in the database 103. Alternatively or in addition, the feedback unit 105 may be configured to provide the usage information (e.g. the usage counters or usage counters aggregated for a particular source of the plurality of data entities) via the data input/output unit 104 to an external device (e.g. another electronic device 100 or a network (sharing) server).

The data input/output unit 104 may be configured to use the usage information (e.g. the usage counters) to manage the amount and/or the source of incoming data entities. By way of example, the feedback unit 105 may analyze the plurality of usage counters for the corresponding plurality of data entities stored in the database 103, and determine that data entities relating to a particular topic, keyword and/or keyphrase have a low degree of usage (average usage counter below a pre-determined threshold value). The data input/output unit 104 may then prevent data entities relating to this topic, keyword and/or keyphrase to be stored in the database 103. The data input/output unit 104 may use the metadata associated with incoming data entities for this purpose. In another example, the feedback unit 105 may determine that data entities from a particular source (e.g. a particular remote electronic device) have a low degree of usage (average usage counter below a pre-determined threshold value). The data input/output unit 104 may then prevent data entities from this source to be stored on the electronic device 100.

Figure 2A:
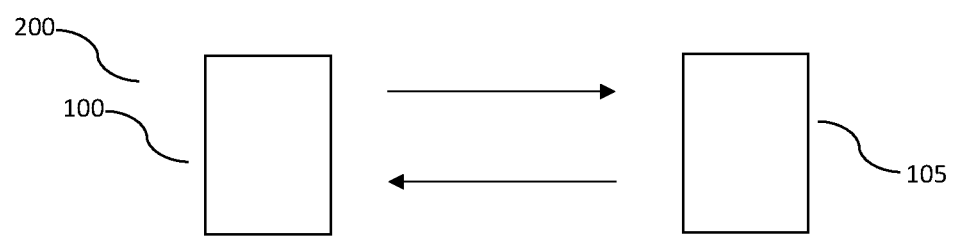
FIG. 2a shows an example peer-to-peer based knowledge sharing system.

FIGS. 2a and b illustrate example configurations of a knowledge sharing system 200 comprising two electronic devices 100, 106. FIG. 2a illustrates a peer-to-peer knowledge sharing system 200. In such peer-to-peer systems the electronic devices 100, 106 may exchange metadata regarding the data entities stored at the respective other electronic devices. As such, each electronic device 100 may hold information (via the metadata) regarding data which is available at the other electronic devices 106 of the knowledge sharing system 200. Alternatively or in addition, the electronic devices 100, 106 may exchange selection data and/or enabling concepts, wherein the selection data specifies topics, keywords and/or keyphrases (i.e. metadata) regarding data entities which the electronic device 106 which is sending the selection data is interested in. On the other hand, the enabling concepts specify topics, keywords and/or keyphrases (i.e. metadata) regarding data entities which the electronic device 100 is willing to share. Using this data, the data files themselves may be exchanged, i.e. the documents that need to be shared may be exchanged.

As such, electronic devices 100 may push data entities onto other electronic devices 106 (using the selection data and/or the enabling concepts) without the other electronic devices 106 having explicitly requested the data entities. Furthermore, electronic devices 106 may download (pull) data entities from other electronic devices 100 (using the exchanged metadata).

Figure 2B:
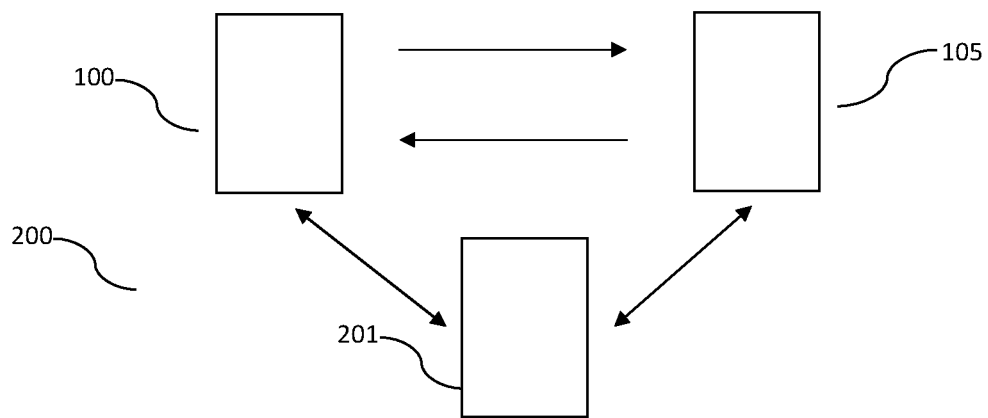
FIG. 2b shows an example client-server based knowledge sharing system.

FIG. 2b illustrates an example client-server knowledge sharing system 200, wherein the system 200 comprises a sharing server 201 in addition to a plurality of electronic devices 100, 106. The sharing server 201 may be used to manage the exchange of data entities between the plurality of electronic devices 100, 106. For this purpose, the sharing server 201 may store the metadata regarding the data entities stored on the electronic devices 100 and store selection data regarding topics, keywords and/or keyphrases that the electronic devices 106 are interested in. On the other hand, the exchange of the plurality of data entities may be performed directly between the plurality of electronic devices 100, 106. Alternatively, the sharing server 201 may also be used for pushing and/or downloading of the plurality of data entities.

Figure 3:
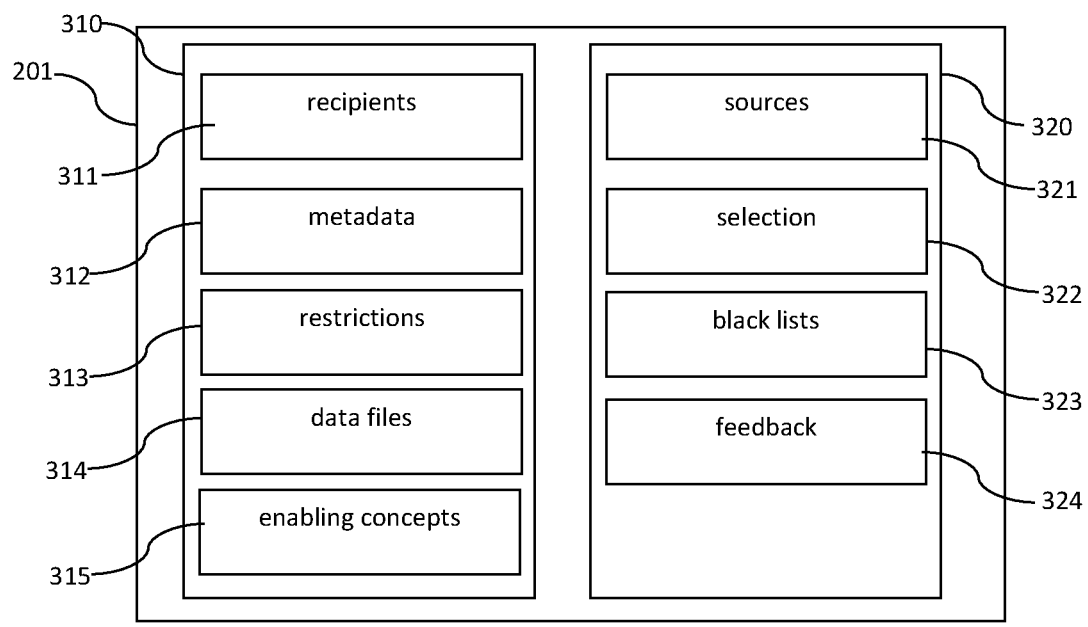
FIG. 3 illustrates a block diagram of an example sharing server.

FIG. 3 illustrates a block diagram of an example sharing server 201. The sharing server 201 may comprise sender related data 310 and recipient related data 320. The sharing server 201 may provide interfaces (e.g. a user interface) for receiving and modifying the sender related data 310 and/or the recipient related data 320 from respective electronic devices 100 (e.g. from the users of the electronic devices 100). The sender related data 310 may comprise information regarding the possible recipients 311, i.e. a list of possible recipient devices 106 that the sender is willing to share information with. Furthermore, the sender related data 310 may comprise the metadata which describes the data entities available at the "sender" electronic device 100. Furthermore, the sender related data 310 may comprise restriction data 313, regarding sharing restrictions with regards to data entities and/or recipients. The server 201 may keep local copies 314 of the data entities available at the "sender" electronic device 100. This may be beneficial if the "sender" electronic device 100 is offline while the recipient needs to download data entities from the "sender" electronic device 100. In alternative implementations, the data entities may be downloaded from the "sender" electronic device 100 directly or from the share server 201 (thus forming triangular connections as shown in FIG. 2b). In addition, the sender related data 310 may comprise enabling concepts 315, i.e. sender constraints which are indicative of topics, keywords and/or keyphrases for which the sender is willing to share information with other devices 106.

The recipient related data 320 comprises information regarding sources (i.e. electronic devices) or groups of sources 321 from which a "recipient" electronic device 106, i.e. an electronic device 106 which is receiving data entities from other electronic devices, is willing to receive data entities. This source list 321 may be understood as an authorization list for remote electronic devices 100 to push data to the "recipient" electronic device 106. Furthermore, the recipient related data 320 may comprise selection data 322 which is indicative of topics, keywords and/or keyphrases which are of interest to the "recipient" electronic device 106. In other words, the selection data 322 may be understood as an authorization of the "recipient" electronic device 106 to receive data entities which meet the conditions comprised within the selection data 322. Furthermore, the recipient related data 320 may comprise black lists specifying a sender and/or a topic, keyword and/or keyphrase which are excluded from sharing data with the "recipient" electronic device 106.

In addition, the recipient related data 320 may comprise feedback information 324 (e.g. counters) regarding the usage of data entities stored on the "recipient" electronic device 106. The feedback information 324 may be aggregated on a per source and/or on a per keyword, keyphrase and/or topic basis. As such, the feedback information 324 may be used to dynamically manage the sources with which the "recipient" electronic device 106 shares data entities and/or manage the keyword, keyphrase and/or topic on which data entities are shared with the "recipient" electronic device 106.

As such, the sharing server 201 comprises sender related data 310 and recipient related data 320 which may be used to control the exchange of data entities between a plurality of electronic devices 100, 106. By way of example a cut set between the recipient list 311 and the source list 321 may be used to identify one or more groups of electronic devices which are willing to share data entities. Furthermore, the metadata 312 and the selection data 322 may be used to identify data entities on a "sender" electronic device 100 which are of interest to a "recipient" electronic device 106. If the "sender" electronic device 100 is part of the source list 321 and if the "recipient" electronic device 106 is part of the recipient list 311, the identified data entities may be downloaded or pushed from the "sender" electronic device 100 to the "recipient" electronic device 106. Alternatively or in addition, the selection data 322 from the "recipient" electronic device 106 and the enabling concepts 315 from the "sender" electronic device 100 may be compared to identify a cut set of keywords, keyphrases and/or topics on which data entities are provided from the "sender" electronic device 100 to the "recipient" electronic device 106.

Figure 4:
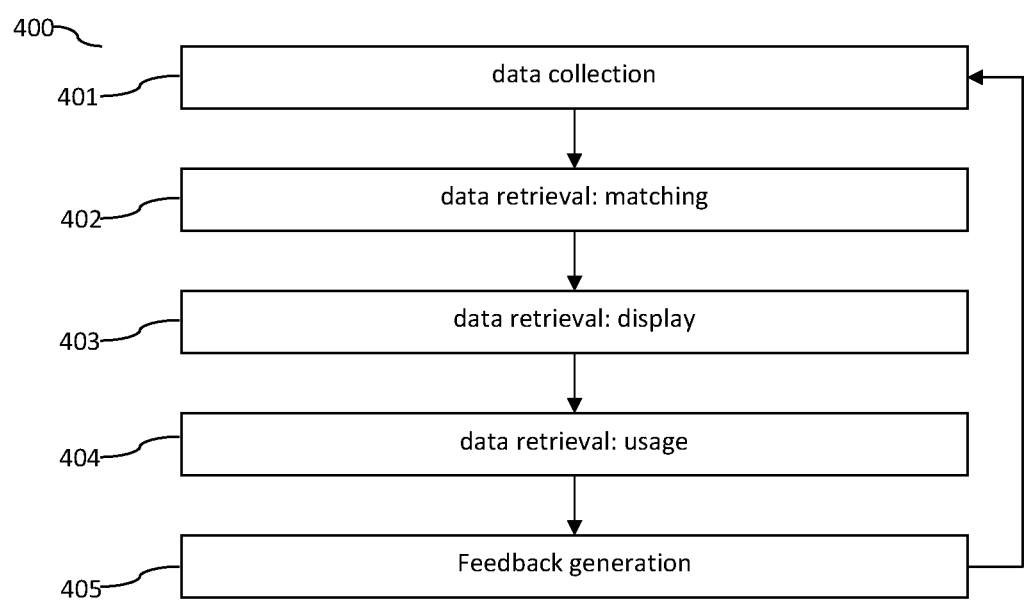
FIG. 4 illustrates an example knowledge sharing method.

FIG. 4 illustrates an example method 400 for knowledge sharing. The method 400 may be executed on an electronic device 106 (or on a plurality of electronic devices 106). The electronic device 106 collects one or more data entities (step 401). The data collection may comprise receiving pushed data entities from a remote electronic device 100 as well as user generated data entities. The pushed data entities may depend on selection data 322 (e.g. selected topics, keywords and/or keyphrases) stored on a sharing server 201 or selection data sent to the remote electronic device. The remote electronic device 100 may depend on a source list 321 stored on a sharing server 201. As such, data entities may have been "passively" stored in the database 103 of the electronic device 106, without the awareness of the user of the electronic device 106. In the context of a data generation process performed on the electronic device 106 (e.g. when generating a new data entity), data entities stored on the electronic device 106 may be retrieved. The data retrieval may be performed by the data retrieval unit 102 of the electronic device 106. As such, matching data entities may be retrieved (step 402). The most relevant of the matching data entities may be displayed on a display of the electronic device (step 403). Eventually, a user may view the displayed data entities and use the data comprised within the viewed data entities (step 404). The degree of consumption of the data entities may be tracked using the feedback unit 105 of the electronic device (step 405). As illustrated by the returning arrow, the usage data may be used to control the data collection step 401. As outlined above, the usage data may be used to control the sources of collected data entities and/or the topics, keywords and/or keyphrases of collected data entities.

In the present document methods and systems for knowledge sharing have been described. The methods and systems comprise flexible means for sharing data among a plurality of electronic devices (e.g. a plurality of smartphones). In particular, the means for sharing data allow the plurality of electronic devices to push data items onto the databases of others of the plurality of electronic devices. The pushed data may be retrieved and used on the plurality of electronic devices using matching means, display means and/or editing means. By means of a feedback mechanism which tracks the degree of retrieval and/or usage of pushed data, the amount and/or the source of pushed data can be controlled. As such, knowledge sharing systems and methods have been described, where:
- the amount of shared data is quantitatively sufficient for the recipient (in view of his particular task);
- the data is as relevant as possible for the recipient (in view of his particular task);
- the activities related to sending data are reduced to a minimum for the producers of data;
- the activities related to receiving data are reduced to a minimum for the consumers of the data;
- the relevance of information is not (too much) dependent on the potential consumer's abilities to search; and
- ideally, the quality of the shared knowledge/information is self-tuning/self adapting towards the recipients needs.

The described methods and systems may be implemented on computer systems, such as servers, work stations, desktop PCs, virtualized desktops, laptops, tablet PCs, and handheld or wireless devices, such as mobile phones, smart phones, PDAs, etc.

The systems and methods described in the present document are not limited to the disclosed exemplary scenarios. Other use cases can benefit from the invention as well. This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art.

The invention claimed is:

1. An knowledge sharing system comprising
   a remote electronic device comprising distribution means configured to automatically
      determine that one or more sender constraints are met for a plurality of first data entities; wherein the one or more sender constraints comprise an enabling constraint requiring that the plurality of first data entities meets one or more of the following conditions: the plurality of first data entities comprises one or more keywords and/or keyphrases, the plurality of first data entities meets one or more semantic rules;
      push the plurality of first data entities to an electronic device, and
   the electronic device comprising
      data gathering means configured to
         allow the reception of the plurality of first data entities from the remote electronic device, subject to one or more recipient constraints; and
         store the received plurality of first data entities in a database of the electronic device;
      matching means configured to identify a relevance of one or more of the plurality of first data entities when generating a new data entity on the electronic device; wherein identifying the relevance of a first data entity from the plurality of first data entities comprises determining that a correlation between content of the new data entity and the first data entity exceeds a pre-determined correlation threshold;
      display means configured to display one or more of the identified first data entities when generating the new data entity; and
      editing means configured to use data from one or more of the displayed first data entities for generating the new data entity.

2. The knowledge sharing system according to claim 1, wherein the electronic device comprises
   feedback means configured to
      track a consumption of one or more of the plurality of first data entities; wherein a data entity is consumed if it has been identified, displayed or used; and
      provide information regarding the tracked consumption.

3. The knowledge sharing system according to claim 2, wherein the feedback means are configured to
   track the consumption by updating a usage counter for the remote electronic device, wherein the usage counter is incremented if one or more of the plurality of first data entities have been identified, displayed or used;
   provide the usage counter.

4. The knowledge sharing system according to claim 3, wherein the one or more recipient constraints comprise a usage constraint requiring that the usage counter for the remote electronic device exceeds a pre-determined usage threshold.

5. The knowledge sharing system according to claim 3, wherein the feedback means are configured to apply a temporal decay to the usage counter.

6. The knowledge sharing system according to claim 1, wherein
   the one or more recipient constraints comprise an enabling constraint requiring that the plurality of first data entities meet one or more of the following conditions: the plurality of first data entities comprises one or more keywords and/or keyphrases, the plurality of first data entities meets one or more semantic rules.

7. The knowledge sharing system according to claim 1, wherein the one or more recipient constraints comprise an inhibiting constraint requiring that the plurality of first data entities and/or the remote electronic device are not part of a recipient black list.

8. The knowledge sharing system according to claim 1, wherein the distribution means are configured to determine that one or more of the plurality of first data entities have been updated at the electronic device; and configured to push the one or more of the plurality of first data entities to the electronic device.

9. The knowledge sharing system according to claim 1, wherein the one or more sender constraints further comprise any one or more of:
   a usage constraint requiring that a consumption by the electronic device of data entities originating from the remote electronic device exceeds a pre-determined consumption threshold,
   a selection constraint requiring that the plurality of first data entities has been selected for sharing, and
   an inhibiting constraint requiring that the plurality of first data entities and/or the electronic device are not part of a sender black list.

10. The knowledge sharing system according to claim 1, wherein the electronic device further comprises deleting means configured to delete one or more of the plurality of first data entities from the database, subject to a deletion constraint.

11. The knowledge sharing system according to claim 10, wherein the deletion constraint comprises
   an observation that the one or more of the plurality of first data entities has not been identified, displayed and/or used for a pre-determined time period; and/or
   an observation that a storage threshold has been reached; and/or
   an observation that the one or more of the plurality of first data entities comprise one or more keywords and/or keyphrases.

12. The knowledge sharing system according to claim 1, wherein the remote electronic device comprises a first database comprising the plurality of first data entities and first metadata indicative of keywords and/or keyphrases and/or semantic rules of each of the plurality of first data entities; the system further comprising
   a sharing server configured to store an image of the first metadata, and comprising sharing means; wherein the sharing means enable the electronic device to
      select the remote electronic device for sharing of a data entity; and
      set the enabling constraint; and wherein the sharing means are configured to initiate the storing of the plurality of first data entities in the database of the electronic device, if the enabling constraint is met for the plurality of first data entities.

13. The knowledge sharing system of claim 12, wherein
the first metadata comprises a white list of electronic devices which are allowed to receive the plurality of first data entities and/or a black list of electronic devices which are not allowed to receive the plurality of first data entities; and wherein the sharing means are configured to enable and/or prevent the storing of the plurality of first data entities, subject to the white list and/or black list.

14. The knowledge sharing system of claim 12, wherein
the remote electronic device is configured to provide updated first metadata to the sharing server, subject to updating at least one of the plurality of first data entities;

the sharing server is configured to inform the electronic device about the updated first metadata regarding the at least one of the plurality of first data entities stored in the database of the electronic device; and the sharing means are configured to trigger the storing of the at least one of the plurality of updated first data entities in the database of the electronic device.

15. A method for knowledge sharing, comprising,
determining, at a remote electronic device, that one or more sender constraints are met for a plurality of first data entities; wherein the one or more sender constraints comprise an enabling constraint requiring that the plurality of first data entities meets one or more of the following conditions: the plurality of first data entities comprises one or more keywords and/or keyphrases, the plurality of first data entities meets one or more semantic rules;

pushing the plurality of first data entities from the remote electronic device to an electronic device;

verifying one or more recipient constraints at the electronic device;

allowing the electronic device to receive the plurality of first data entities, if the one or more recipient constraints are met;

storing the pushed plurality of first data entities in a database of the electronic device;

identifying a relevance of one or more of the plurality of first data entities when generating a new data entity on the electronic device; wherein identifying the relevance of a first data entity from the plurality of first data entities comprises determining that a correlation between content of the new data entity and the first data entity exceeds a pre-determined correlation threshold;

displaying at the electronic device one or more of the identified first data entities when generating the new data entity; and using at the electronic device data from one or more of the displayed first data entities for generating the new data entity.

* * * * *